J. KLEIN.
WASTE FERRULE.
APPLICATION FILED JAN. 4, 1909.
939,711.
Patented Nov. 9, 1909.
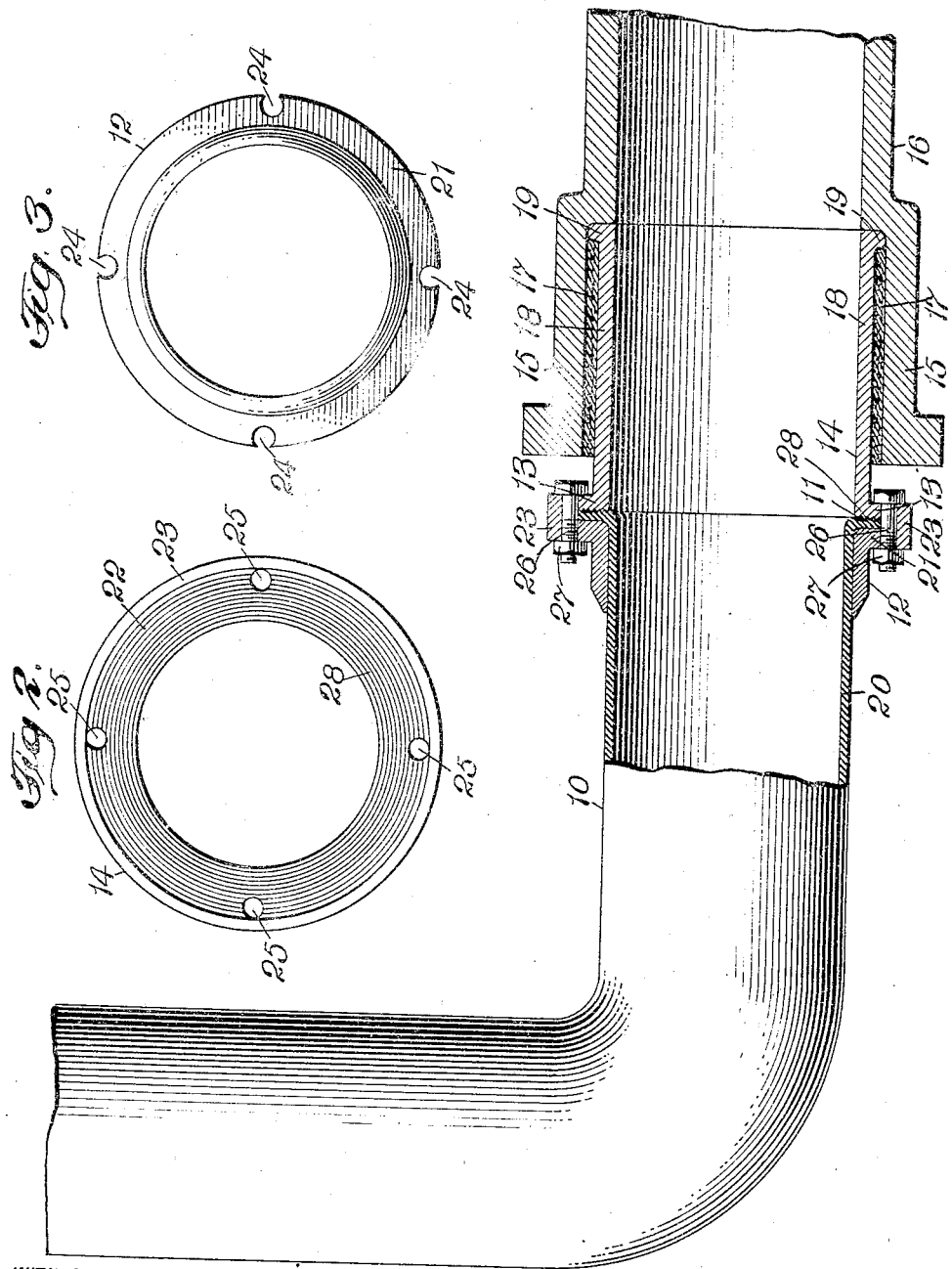
WITNESSES
INVENTOR
Joseph Klein
BY
Criswell & Criswell
ATTORNEYS

UNITED STATES PATENT OFFICE.

JOSEPH KLEIN, OF NEW YORK, N. Y., ASSIGNOR OF ONE-HALF TO EMIL STERN, OF NEW YORK, N. Y.

WASTE-FERRULE.

939,711.  Specification of Letters Patent.  Patented Nov. 9, 1909.

Application filed January 4, 1909. Serial No. 470,628.

*To all whom it may concern:*

Be it known that I, JOSEPH KLEIN, a citizen of the United States, and a resident of New York, county and State of New York, have invented certain new and useful Improvements in Waste-Ferrules, of which the following is a full, clear, and exact description.

This invention relates more particularly to a plumber's ferrule for use in connection with the waste pipes for closets and the like.

In the construction of the waste connection for closets, it is usual to have a lead bend to which is connected a ferrule member, and this ferrule member is packed at one end into the end of the usual cast iron waste or other pipe. The ferrule member is joined to the lead pipe by means of a wipe joint which is not only difficult to make but requires skilled labor to effect a joint of this kind. This is particularly so on the size of pipe usually employed for closet connections, and besides the lead or solder very often enters the ferrule or pipe, and as the joint is usually not a clean one on the interior thereof, refuse will collect therein and this often results in the stoppage of the waste connection with disagreeable effects resulting therefrom. In case of necessity it is also difficult to detach the lead bend and parts owing to the nature of the joint.

The primary object of the invention is to overcome the objectionable features referred to, and to provide a joint which will have a substantially smooth interior surface and to so form the end of the lead bend that it will serve as a packing or means for forming a tight joint with the ferrule member.

Another object of the invention is to provide a simple and efficient device whereby the lead bend may be quickly and readily joined to the ferrule member by an inexperienced or unskilled person.

A further object of the invention is to provide a joint which may be readily taken apart, and the ferrule member readily inserted into waste pipe and the lead bend connected thereto in such a way as to form a perfectly tight and neat joint.

The invention will be hereinafter more particularly described with reference to the accompanying drawings, which form a part of this specification, and will then be pointed out in the claim at the end of the description.

In the drawings, Figure 1 is a section, partly in elevation, showing one form of the invention as applied to the usual lead bend. Fig. 2 is a detail end view of the ferrule member, and Fig. 3 is a detail view of the ring or clamping member.

The connection 10 may be of the usual or of any preferred form of lead bend which serves to connect the waste of a closet with the waste pipe, and said connection or bend 10 has one end, as at 11, flared outwardly to provide an integral flange which is adapted to be clamped between the element or clamping member 12 and the flanged or enlarged part 13 of the ferrule member 14. This ferrule member 14 is adapted to fit in the enlarged end 15 of the usual or any preferred form of waste pipe 16, which is usually of cast iron, and said enlarged end 15 of the waste pipe is provided with a recess 17 in which the part 18 of the ferrule member is adapted to fit. The recess 17 is somewhat larger than the body portion of the ferrule member and on the end of said body portion is a part 19 which is adapted to fit in the recess 17 to properly guide said ferrule member, and in the recess 17 between the body portion of the ferrule member and the enlarged part 15 is a packing of oakum, lead or other sealing medium by which the ferrule member is properly held within the waste pipe.

The clamping member or element 12 may be of the form of a ring, and may fit loosely over the body 20 of the lead bend and independent thereof, and said ring 12 has a flanged part 21 which is adapted to fit into a recess 22 formed by an overhanging marginal flange or part 23 extending substantially parallel with the body portion of the ferrule member and at right angles to the flanged part 13. This clamping element or member 12 is provided with a plurality of recesses or openings 24 around the edge thereof, and these openings are adapted to register with the openings 25 of the ferrule member 14. A number of bolts 26 pass through the openings 24 and 25, and on the ends of said bolts are nuts 27 which serve to draw the flanged parts 13 and 21 toward each other and to clamp the enlarged or flared part 11 of the lead bend between said ferrule member and the ring member. As the lead member or bend is compressible, and as the inner surface of the part 13 of the ferrule 14 may be roughened, as at 28, a tight and effective joint between the member or connection 10 and the ferrule member is secured, though if desired a separate packing may be provided between the enlarged part 11 and the ferrule member.

From the foregoing, it will be seen that a simple and efficient joint is provided between the ferrule member and the connection leading from the closet; that said joint is much more easily made than the usual wipe joint; that said joint does not require the skill necessary for making the joint as ordinarily made; that the waste and refuse is less likely to collect and thereby stop the passage through the waste connection, and that by forming the ferrule and clamping members and joining them together in the manner shown an effective and perfect seal is secured between the parts at the joint.

Having thus described my invention, I claim as new and desire to secure by Letters Patent:—

The combination with a waste member provided with an annular flange, of a waste pipe having an enlarged end forming an internal annular shoulder, a ferrule member, one end of which abuts against said shoulder while its opposite end is provided with an annular flange having an overhanging portion, the outer surface of said flange abutting the flange of the waste member, a clamping ring having an annular flange formed with peripheral notches registering with bolt holes in the flange of the ferrule and means for connecting the clamping ring and ferrule comprising bolts extending through the holes in the ferrule flange and the notches in the clamping ring flange, and nuts bearing against said clamping ring flange, and the overhanging portion of the ferrule flange.

This specification signed and witnessed this 31st day of December A. D. 1908.

JOSEPH KLEIN.

Witnesses:
W. A. TOWNER, Jr.,
A. REDMOND.